(12) United States Patent
Bassi

(10) Patent No.: US 8,104,140 B2
(45) Date of Patent: Jan. 31, 2012

(54) DECELERATING STOP DEVICE FOR A MOVABLE MEMBER, IN PARTICULAR A FURNITURE DOOR OR DRAWER, FITTABLE TO A STOP SURFACE OF THE MOVABLE MEMBER

(75) Inventor: Alberto Bassi, Turin (IT)

(73) Assignee: ITW Industrial Components S.R.L. Con Unico Socio, Milan (IT)

( * ) Notice: Subject to any disclaimer, the term of this patent is extended or adjusted under 35 U.S.C. 154(b) by 414 days.

(21) Appl. No.: 12/280,447

(22) PCT Filed: Mar. 29, 2007

(86) PCT No.: PCT/IB2007/000817
§ 371 (c)(1),
(2), (4) Date: Aug. 22, 2008

(87) PCT Pub. No.: WO2007/116273
PCT Pub. Date: Oct. 18, 2007

(65) Prior Publication Data
US 2009/0119873 A1    May 14, 2009

(30) Foreign Application Priority Data

Mar. 31, 2006 (IT) .............................. TO2006A0242

(51) Int. Cl.
*E05F 3/00*          (2006.01)
(52) U.S. Cl. ................. 16/84; 16/82; 188/297
(58) Field of Classification Search ............. 16/82, 83,
16/84, 85, 54, 286; 188/297, 302, 305, 308,
188/313, 314, 315, 316, 317, 319.1, 322.15,
188/322.16, 322.17, 322.18, 322.5
See application file for complete search history.

(56) References Cited

U.S. PATENT DOCUMENTS 1,966,956 A * 7/1934 Dunn ................................ 16/84
(Continued)

FOREIGN PATENT DOCUMENTS
DE          20210295 U      9/2002

OTHER PUBLICATIONS

ISR for PCT/IB2007/000817 dated Sep. 13, 2007.

*Primary Examiner* — Victor Batson
*Assistant Examiner* — Jeffrey O Brien
(74) *Attorney, Agent, or Firm* — Lowe Hauptman Ham & Berner, LLP

(57) ABSTRACT

A decelerating device intended to intercept an end-of-stroke part of a closing path of a mobile member, such as a furniture drawer or door, including: a body fastenable in use to an abutting surface for the mobile member and internally defining a sealed chamber filled in use with a viscous fluid; a pushrod at least in part overhanging from the body and being adapted to cooperate in use with the mobile member, the pushrod being integral with a stem slidingly accommodated in the body against the bias of elastic means between an extracted position of the pushrod and a retracted position; and a piston accommodated in the sealed chamber so as to divide it into two portions hydraulically connected to each other and mechanically connected to the stem; wherein the stem presents a first end integrally connected to the pushrod and a second end opposite to the first, both slidingly accommodated in the body outside the sealed chamber and fluid-tightly towards the sealed chamber itself; the piston is provided with a mobile sealing member to choke the hydraulic communication between the two portions of the sealed chamber only during the stroke of the stem towards the retracted position.

10 Claims, 2 Drawing Sheets

U.S. PATENT DOCUMENTS

| | | | | |
|---|---|---|---|---|
| 2,071,701 | A | 2/1937 | Mejean | |
| 2,602,662 | A * | 7/1952 | Kintzinger | 16/85 |
| 3,628,638 | A * | 12/1971 | Curchack | 188/312 |
| 3,909,877 | A * | 10/1975 | Christy et al. | 16/85 |
| 4,048,905 | A * | 9/1977 | Souslin | 188/284 |
| 4,265,344 | A * | 5/1981 | Taylor | 188/322.17 |
| 5,029,677 | A * | 7/1991 | Mitsui | 188/267.1 |
| 5,076,403 | A * | 12/1991 | Mitsui | 188/267.1 |
| 5,157,806 | A * | 10/1992 | Wartian | 16/84 |
| 6,615,450 | B2 * | 9/2003 | Salice | 16/85 |
| 6,789,652 | B2 * | 9/2004 | Honig et al. | 188/312 |
| 6,971,493 | B2 * | 12/2005 | Yoshimoto | 188/312 |
| 7,017,229 | B2 * | 3/2006 | Walcome | 16/82 |
| 7,017,720 | B2 * | 3/2006 | Yoshimoto | 188/315 |
| 2005/0133321 | A1 * | 6/2005 | Fujishima et al. | 188/313 |

* cited by examiner

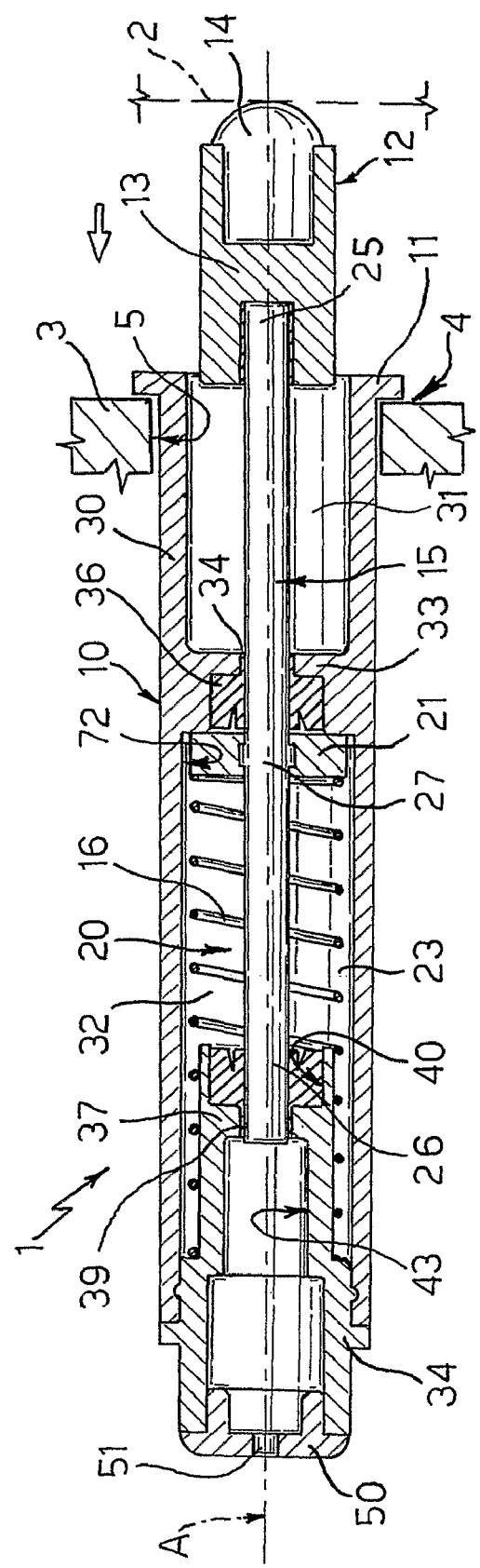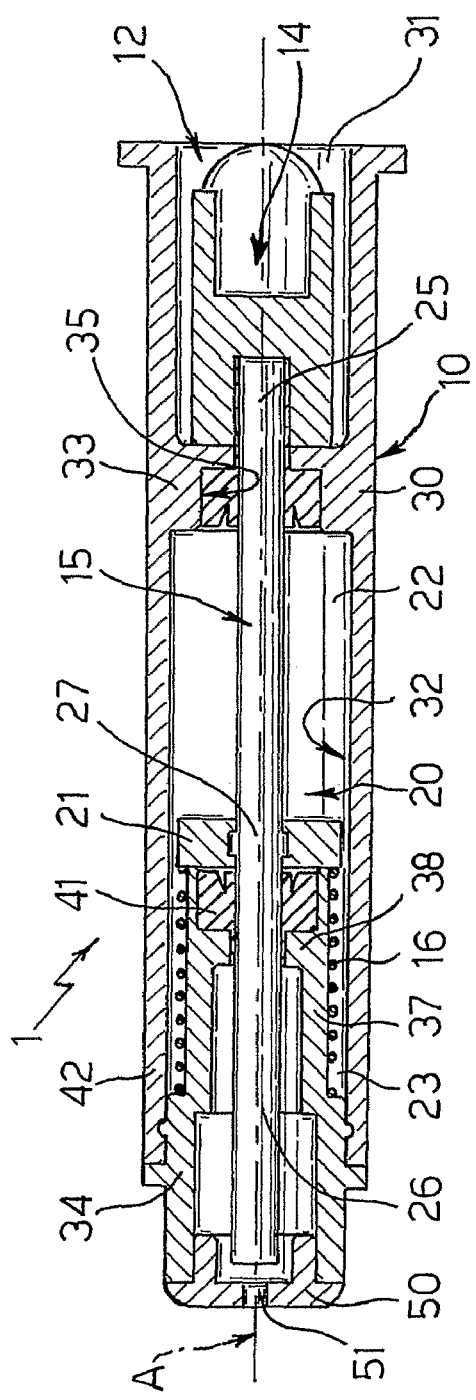

DECELERATING STOP DEVICE FOR A MOVABLE MEMBER, IN PARTICULAR A FURNITURE DOOR OR DRAWER, FITTABLE TO A STOP SURFACE OF THE MOVABLE MEMBER

RELATED APPLICATIONS

The present application is based on International Application Number PCT/IB2007/000817 filed Mar. 29, 2007, and claims priority from Italian Application Number TO2006A000242 filed Mar. 31, 2006, the disclosures of which are hereby incorporated by reference herein in their entirety.

TECHNICAL FIELD

The present invention relates to an end-of-stroke decelerating device for a mobile member, specifically a furniture door or drawer, applicable to an abutting surface for the mobile member in order to intercept an end-of-stroke part of a closing path of the mobile member itself.

BACKGROUND ART

It is known from EP1162338B1 to apply decelerating devices, also referred to as shock absorbers, to single or modular pieces of furniture in order to prevent the mobile furniture member, e.g. a door or a drawer, from violently slamming onto an abutting surface or end-of-stroke for the same, during the closing phase of the door or drawer, e.g. following the reception of an excessive closing push by a user.

The device according to EP1162338B1 is essentially based on the combined action of a spring and a viscous fluid which act on a piston integral with a stem integral with a pushrod which cooperates in use with the mobile member to be decelerated, which stem is fluid-tightly sliding in a body containing the spring and the viscous fluid; the known described device, while being satisfactory as a whole, presents the drawback of requiring a relatively complex internal construction in order to allow the free movement of the piston in the viscous oil bath, due to the volume reduction to which the space inside the body which contains the viscous fluid is subjected consequent to the progressive entrance of the stem in the same, during its sliding movement towards the retracted position.

More in general, the known device further presents a relatively high cost and dimensions, specifically if a high contrast force on the piston is required. During the opening step of the door or drawer, the stem further requires a certain time in order to resume the extracted position which may not be sufficient if an immediate closing step occurs, whereby the contrast action developed by the device in this case may not be sufficient to avoid slamming. Finally, the assembly of the known device is relatively complex and may leave air bubbles in the viscous fluid which in use may produce noise or 'rough' operation despite the presence of means (such as compressible sponges) which attenuate the effects thereof.

DISCLOSURE OF INVENTION

It is the object of the present invention to avoid such drawbacks by providing a decelerating device adapted to intercept an end-of-stroke part of a closing path of a mobile member, such as a furniture drawer or a door, presenting at the same time high decelerating efficiently and small dimensions, and further presenting low manufacturing cost and high assembly ease.

The present invention thus relates to a decelerating device for the final closing phase of furniture mobile members, as defined in claim 1.

Specifically, the device of the invention comprises a body fittable in use to an abutting surface for the mobile member and internally defining a sealed chamber filled in use with a viscous fluid, a pushrod at least in part overhanging from the body and being adapted to cooperate in use with the mobile member, the pushrod being integral with a stem slidingly accommodated in the body against the bias of elastic means between an extracted position of the pushrod and a retracted position, and a piston accommodated in the sealed chamber so as to divide it into two portions maintained in reciprocal hydraulic communication, and mechanically connected to the stem.

The stem presents a first end integrally connected to the pushrod and a second end opposite to the first and, according to a feature of the invention, the first and second ends of the stem are both slidingly accommodated in the body outside the sealed chamber and fluid-tightly towards the sealed chamber itself.

Specifically, the stem is thoroughly and fluid-tightly mounted through the sealed chamber with its intermediate portion, which integrally and coaxially carries the piston, and the elastic means are preferably arranged mounted inside the sealed chamber, submerged in use in the viscous fluid, in order to attenuate to the maximum all operating noise.

In this manner, along with an extremely compact design, it is obtained the advantage of being able to maintain the volume of the sealed chamber unchanged in any position of the stem, simply by making the first and second ends of the stem of the same radial section; indeed, as the first end of the stem progressively penetrates in the sealed chamber in consequence of the motion of the stem towards the retracted position, the second end of the stem exits from the sealed chamber and, according to another aspect of the invention, is accommodated within a seat obtained in a closing cap of a casing delimiting the sealed chamber and defined by a tubular portion of the cap, which is overhangingly projected within the sealed chamber itself, thus reducing the axial dimensions of the device.

Preferably, the piston is provided with a mobile sealing member to choke the hydraulic communication between the two portions of the sealed chamber only during the stroke of the stem towards said retracted position. In this manner, it is possible to develop the maximum resistance to sliding of the stem only during the stroke towards the retracted position, while the stroke towards the extracted position is essentially only imperceptibly decelerated, thus ensuring prompt reaction times of the deceleration device according to the invention.

Finally, the invention also relates to a piece of furniture provided with at least one decelerating device of the above-described type fitted to an abutting surface of at least one mobile member, such as a furniture drawer or door, so as to be adapted by means of said pushrod to intercept an end-of-stroke part of a closing path of the mobile member to consequently produce a sliding of the stem towards the retracted position of the pushrod, against the bias of said elastic means.

BRIEF DESCRIPTION OF THE DRAWINGS

Further features and advantages of the present invention will be apparent in the following description of non-limitative embodiments thereof, given with reference to the figures of the accompanying drawings, in which:

FIGS. 1 and 2 show a same elevation view of a decelerating device according to the invention shown in radial section with respect to an axis of operation A of the same and, respectively, in a first and second different axial end-of-stroke positions.

BEST MODE FOR CARRYING OUT THE INVENTION

Figure 3:
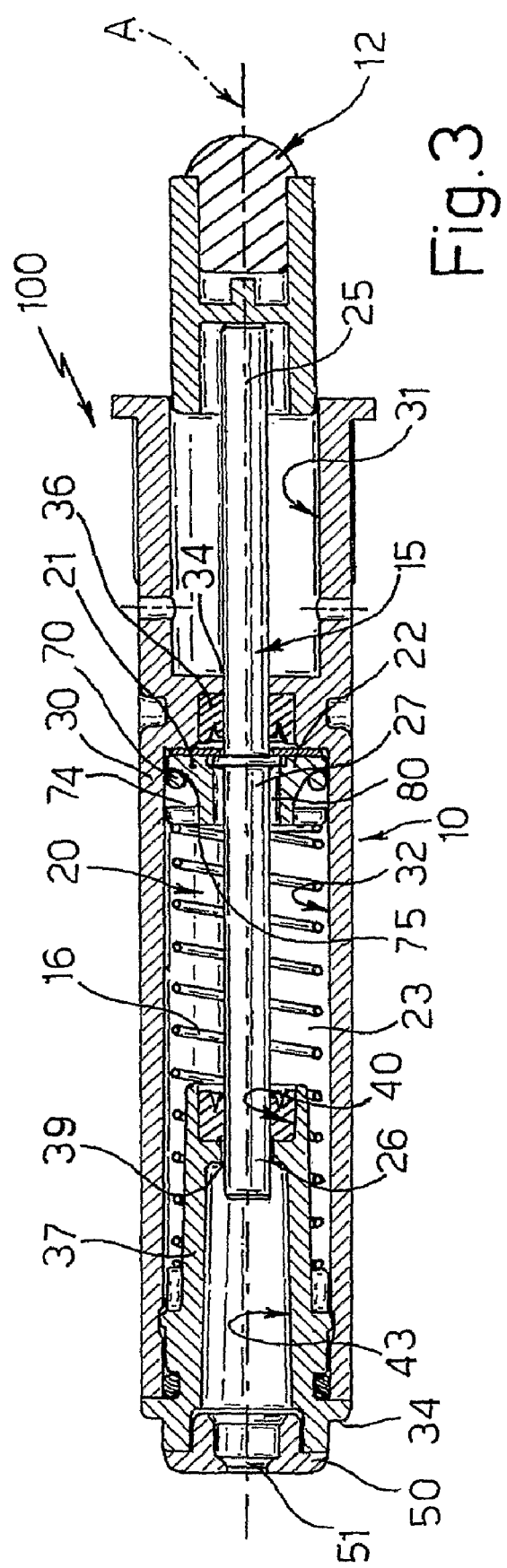
FIGS. 3 and 4 show the same views as FIGS. 1 and 2 of a possible variant of the device in FIG. 1.

With reference to FIGS. 1 and 2, reference number 1 indicates as a whole a decelerating device of the type adapted to intercept an end-of-stroke part of a closing path (shown by the arrow in FIG. 1) of a mobile member 2, such as a drawer or a door, of a piece of furniture 3, of which only a part of an abutting or end-of-stroke surface 4 for mobile member 2 is shown for the sake of simplicity.

Device 1 comprises a body 10 fittable in use to surface 4, e.g. in a seat 5 of piece of furniture 3 and abutting against surface 4 with a collar 11, and a pushrod 12 at least in part overhanging from body 10 in at least one extracted position thereof from body 10, shown in FIG. 1, and being adapted to cooperate in use with mobile member 2; pushrod 12, which in turn comprises a bushing 13 and a feeler pad 14 carried by bushing 13, is integrally mounted on a stem 15 slidingly accommodated in body 10 against the bias of elastic means 16 between the mentioned extracted position of pushrod 12, in which stem 15 is normally maintained by elastic means 16, and a retracted position of pushrod 12 itself, shown in FIG. 2.

Body 10 defines therein a sealed chamber 20 filled in use with a viscous fluid, e.g. silicone oil; and device 10 further comprises a piston 21 accommodated in sealed chamber 20 so as to divide it into two portions 22, 23 (FIG. 2) of variable volume and constantly maintained in reciprocal hydraulic communication, piston 21 being mechanically connected to stem 15.

Stem 15 displays a first end 25 integrally connected to pushrod 12 and a second end 26, opposite to the first, according to the invention both slidingly accommodated within body 10 outside sealed chamber 20 and fluid-tightly towards sealed chamber 20 itself.

Specifically, stem 15 is thoroughly and fluid-tightly mounted through sealed chamber 20 with its intermediate portion 27, which integrally and coaxially carries piston 21, and elastic means 16 are arranged mounted inside sealed chamber 20, submerged in use in the viscous fluid which fills it, positioned so as to act on a face of piston 21 facing opposite sides of said pushrod 12.

According to an aspect of the invention, body 10 comprises a casing 30 shaped so as to define therein a first cup-shaped concavity 31, and a second cup-shaped concavity 32, reciprocally opposite and divided by a common bottom wall 33 provided with a passage hole 34 for the stem and with a first seat 35 for a seal 36 rubbing on stem 15; first concavity 31 is shaped so as to be adapted to accommodate therein, through a mouth thereof and abuttingly against bottom wall 33, pushrod 12 in the retracted position of the same (FIG. 2).

Second concavity 32, whose axial length is longer than concavity 31, is fluid-tightly closed, at one mouth thereof, by a cap 34 so as to define, along with cap 34, the mentioned sealed chamber 20 within body 10; cap 34 is indeed cup-shaped and overhangingly extends inside cavity 32 of casing 30 with its tubular end portion 37 ending with a bottom wall 38 provided with a passage hole 39 for stem 15 and a second seat 40 for a seal 41 rubbing on the stem, of the same type as seal 36.

Seats 35 and 40 presenting assembly mouths for corresponding seals 36 and 41 facing opposite sides, and specifically the mouth of seat 35 faces cap 34. Furthermore, tubular portion 37 of cap 34 radially forms on its external side a predetermined clearance with a side wall 42 of second concavity 32 and internally defines a seat 43 accommodating second end 26 of the stem, in the retracted position of pushrod 12 (FIG. 2).

Finally, in the case in point shown, elastic means 16 are defined by a helical spring accommodated within the predetermined clearance between tubular portion 37 overhangingly projected within concavity 32 and side wall 42, fittingly carried by tubular portion 37 itself and sandwiched, with a predetermined preload, between the mentioned face of piston 21 opposite to pushrod 12 and cap 34, which acts as abutment for spring 16.

In this manner, the assembly of device 1 is extremely rapid and easy, as easy and cost-effective is the manufacture of body 10; it is indeed sufficient to manufacture casing 30, preferably by moulding of synthetic plastic material, to mount seal 36 in seat 35, to mount stem 15 with piston 21 already assembled in concavity 32 and finally to close the mouth of the same with cap 34, also for example formed by synthetic plastic material, after assembly of seal 41 in seat 40 and of spring 16. Cap 34 may be fixed to casing 30, to form body 10, either by snapping or screwing or simply by being driven into the mouth of concavity 32; then it is possibly welded to casing 30.

Cap 34 is in all cases closed, at the access thereof toward the tubular portion 37, i.e. toward seat 43 for end 26 of stem 15, by a cover 50, e.g. snappingly mounted, provided with at least one vent opening 51 for the air present in seat 43, so as to compensate for the reduction of internal volume which the same is subjected to upon the penetration within it, through hole 39, of end 26 of stem 15.

Figure 4:
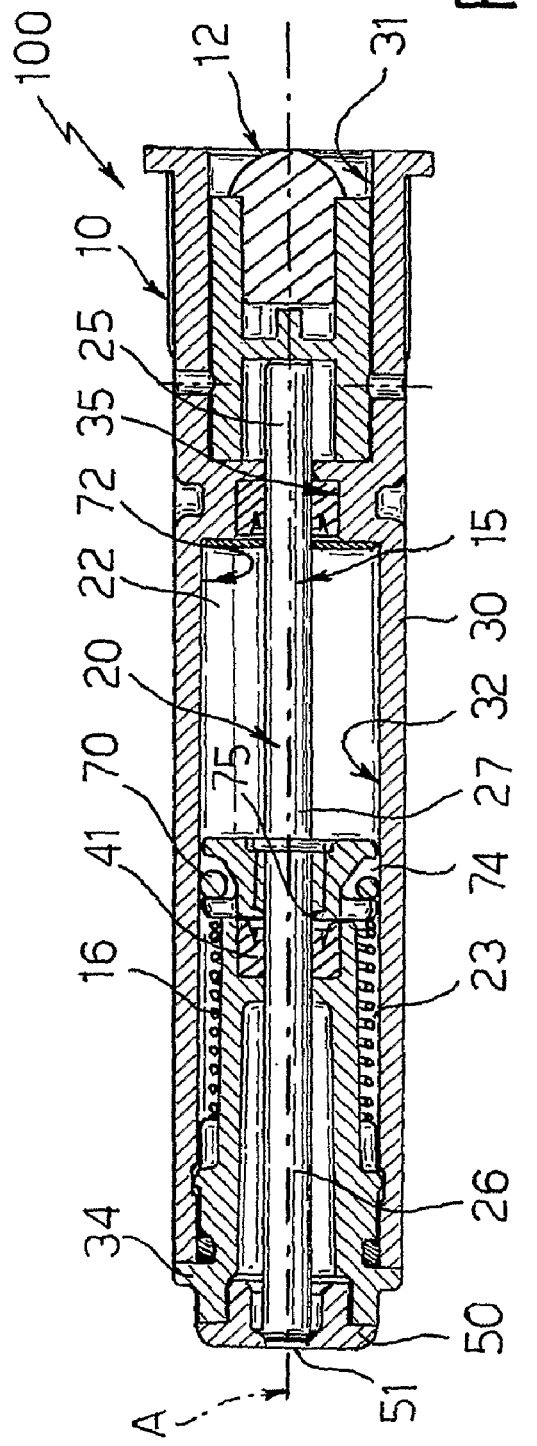

FIGS. 3 and 4 show a possible and preferred variant 100 of device 1 described above. Similar or equivalent details to those of device 1 will be indicated for the sake of simplicity by the same reference numbers.

According to variant 100 shown, for other aspects identical to device 1, piston 21 is provided with a sealing member 70 carried by piston 21 in mobile and specifically floating manner for choking, as will be explained, the hydraulic communication between the two portions 22, 23 of sealed chamber 20 only during the stroke of stem 15 towards the retracted position of pushrod 12 (FIG. 4).

Specifically, a permanent hydraulic communication between the two portions 22, 23 of sealed chamber 20 is defined, in previously described device 1, by a radial clearance of predetermined entity between piston 21 and an internal lateral surface 72 (FIG. 1) of sealed chamber 20, through which the viscous fluid which fills it may in use leak upon the sliding of stem 15; on the contrary, in device 100 the only permanent hydraulic communication between two portions 22, 23 of sealed chamber 20 is defined by at least one passage 80 obtained between piston 21 and stem 15, while the radial clearance existing between piston 21 and internal lateral surface 72 (FIG. 4) of sealed chamber 20, although present, is fluid-tightly closed by sealing member 70.

In the case of device 1, the radial clearance between the piston and wall 72 is made sufficiently small so as to define a calibrated restriction which produces, during the leakage of the viscous fluid, a high energy dissipation both in the stroke of stem 15 towards the retracted position and also towards the extracted position.

In the case of device 100, on the other hand, the radial clearance between the piston and wall 72, sealed in all cases by sealing member 70, is made relatively large and so as not to define a calibrated restriction, besides greatly reducing in this manner the manufacturing cost of both piston 21 and body 10. The calibrated restriction is instead defined by passage 80.

In device 100, the floating sealing member 70 preferably consists of an o-ring mounted with both radial and axial clearance within an annular peripheral seat 74 of piston 21 radially delimited towards sliding axis A of the stem by a conical surface 75 which tapers facing the opposite side of pushrod 12, i.e. tapering off towards cap 34. The diameter of the o-ring 70 is chosen so as to fluid-tightly cooperate with lateral surface 72.

In use, during the stroke of stem 15 towards the retracted position, the pressure exerted by the viscous fluid produces an axial displacement of the o-ring against conical surface 75, thus producing a progressive reduction of the radial and axial clearances between piston and o-ring, until the clearances are both cancelled out; in such conditions, the viscous fluid may not leak between piston and o-ring and is consequently forced to leak only through passage 80 forming a calibrated restriction, with consequent dissipation of energy and great deceleration of the movement of the piston.

On the other hand, during the stroke in the opposite direction, the pressure of the viscous fluid (which will be exerted on the piston only, along with the bias of spring 16) will be such as to distance the o-ring from the piston, restoring the original assembly clearance and thus allowing the fluid itself to flow freely, without strong resistance, between o-ring 70 and piston 21, with consequent very low reduction of the axial movement of stem 15.

The invention claimed is:

1. A decelerating device adapted to intercept an end-of-stroke part of a closing path of a mobile member, the device comprising:
   a body configured to be fastened to an abutting surface for the mobile member and internally defining a sealed chamber configured to be filled with a viscous fluid;
   an elastic member housed in the body;
   a pushrod at least in part overhanging from the body and configured to cooperate with the mobile member, the pushrod being integral with a stem slidingly accommodated in the body against the bias of the elastic member between an extracted position of the pushrod and a retracted position, said elastic member bounding a portion of said stem within said body; and
   a piston accommodated in the sealed chamber so as to divide it into two portions maintained in reciprocal hydraulic communication, and mechanically connected to the stem; the stem presenting a first end integrally connected to the pushrod and a second end opposite to the first, wherein said first and second ends of the stem are both configured to slide outside the sealed chamber while housed in the body and are configured to slide in a fluid-tight manner with regard to the sealed chamber;
   wherein said body comprises a casing shaped so as to define therein a first and a second cup-shaped concavities, reciprocally opposite and subdivided by a common first bottom wall provided with a passage hole for the stem and with a first seat for a seal rubbing on the stem; the first concavity being shaped to accommodate said pushrod therein in said retracted position through one mouth thereof and abuttingly against said first bottom wall; and the second concavity being fluid-tightly closed to one mouth thereof by a cap, so as to define said sealed chamber, said cap comprising a cavity therewithin to accommodate a portion of said stem in said retracted position.

2. The device according to claim 1, wherein said stem is throughly and fluid-tightly mounted through said sealed chamber with its intermediate portion, which carries integral and coaxial said piston.

3. The device according to claim 1, wherein said elastic member is mounted inside said sealed chamber, is submerged in use in said viscous fluid, and acts on a face of said piston opposite of said pushrod.

4. The device according to claim 1, wherein said cap is cup-shaped and overhangingly protrudes inside the second concavity of the casing with its tubular portion ending with a second bottom wall provided with a passage hole for the stem and a second seat for a seal rubbing on the stem; said first and second seats presenting assembly mouths for the respective seals facing opposite sides, that of said first seat facing said cap.

5. The device according to claim 4, wherein said tubular portion of the cap radially forms on the outside a predetermined clearance with a lateral wall of the second concavity and internally defines a second seat accommodating the second end of the stem, in the retracted position of the pushrod; said elastic member being defined by a helical spring accommodated within said predetermined clearance, fittingly carried by the tubular portion of the cap and sandwiched with a predetermined preload between said piston and said cap.

6. The device according to claim 5, wherein said cup-shaped cap is closed to its access mouth toward said tubular portion of the same, by a cover provided with at least one vent opening for the air present in said second seat for the second end of the stem.

7. The device according to claim 1, wherein the piston is provided with a mobile sealing member for choking said hydraulic communication between the two portions of the sealed chamber only during the stroke of the stem toward said retracted position.

8. The device according to claim 7, wherein said hydraulic communication between the two portions of the sealed chamber is defined by a radial clearance between said piston and an internal lateral surface of said sealed chamber, through which said viscous fluid leaks following the sliding of the stem, and said mobile sealing member being formed by an o-ring mounted with clearance in a peripheral annular seat of the piston radially delimited towards the sliding axis of the stem by a conical surface, which tapers facing the opposite side of the pushrod.

9. A piece of furniture provided with a decelerating device according to claim 1 fitted to an abutting surface of at least one mobile member of the furniture, so as to be adapted to intercept with said pushrod an end-of-stroke part of a closing path of the mobile member to consequently produce a sliding of the stem towards the retracted position of the pushrod, against the bias of said elastic member.

10. The piece of furniture according to claim 9, wherein the mobile member is a drawer of the furniture.

* * * * *